(12) United States Patent
Miyoshi

(10) Patent No.: US 8,793,424 B2
(45) Date of Patent: Jul. 29, 2014

(54) SWITCH APPARATUS

(75) Inventor: Takashi Miyoshi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 245 days.

(21) Appl. No.: 13/212,262

(22) Filed: Aug. 18, 2011

(65) Prior Publication Data
US 2012/0066428 A1 Mar. 15, 2012

(30) Foreign Application Priority Data

Sep. 9, 2010 (JP) ................................ 2010-202282

(51) Int. Cl.
*G06F 13/36* (2006.01)
*H04L 12/46* (2006.01)
*G06F 13/40* (2006.01)

(52) U.S. Cl.
CPC ...... *H04L 12/462* (2013.01); *G06F 2213/0052* (2013.01); *G06F 13/4022* (2013.01)
USPC ............................. 710/311; 710/312; 710/316

(58) Field of Classification Search
USPC ........................................ 710/312, 311, 316
See application file for complete search history.

(56) References Cited

U.S. PATENT DOCUMENTS

| | | | | |
|---|---|---|---|---|
| 7,610,431 | B1* | 10/2009 | Watkins et al. | 710/312 |
| 7,650,275 | B2* | 1/2010 | Herrell et al. | 703/25 |
| 7,689,728 | B2 | 3/2010 | Hirata | |
| 7,725,632 | B2 | 5/2010 | Baba et al. | |
| 2006/0253618 | A1* | 11/2006 | Frouin et al. | 710/8 |
| 2008/0137676 | A1* | 6/2008 | Boyd et al. | 370/419 |
| 2009/0265501 | A1* | 10/2009 | Uehara et al. | 710/312 |
| 2012/0311226 | A1* | 12/2012 | Itakura | 710/316 |

FOREIGN PATENT DOCUMENTS

| | | | |
|---|---|---|---|
| JP | 2007-226653 A | 9/2007 | |
| JP | 2009-169842 A | 7/2009 | |

* cited by examiner

*Primary Examiner* — Nimesh G Patel
(74) *Attorney, Agent, or Firm* — Fujitsu Patent Center

(57) ABSTRACT

A switch apparatus capable of being coupled to a computer and a plurality of devices, the switch apparatus includes: a first bridge coupled to the computer; a second-bridge group coupled to the devices; and a controller for controlling the connection relationship between the first bridge and the second-bridge group, wherein the controller assigns physical identifiers having different bus identifiers to the plurality of devices, assigns logical identifiers to the devices in accordance with an identifier assigned to the first bridge in response to an instruction for reading connection states of the devices received from the computer when the computer is coupled to the first bridge, and converts a physical identifier and a logical identifier of a packet transmitted between the first bridge and the second-bridge group in accordance with the correspondence relationships between the physical identifiers and the logical identifiers.

6 Claims, 9 Drawing Sheets

FIG. 6

| | PHYSICAL IDENTIFICATION NUMBER 51 | TYPE 52 | PHYSICAL MEMORY ADDRESS RANGE 53 | DEVICE NUMBER 54 | LOGICAL IDENTIFICATION NUMBER 61 | LOGICAL MEMORY ADDRESS RANGE 62 |
|---|---|---|---|---|---|---|
| 55 | (1.0.0) | DOWNSTREAM BRIDGE 22 | N/A | -1 | — | — |
| 56 | (1.1.0) | DOWNSTREAM BRIDGE 23 | N/A | -1 | — | — |
| 57 | (1.2.0) | DOWNSTREAM BRIDGE 24 | N/A | -1 | — | — |
| 58 | (2.0.0) | DEVICE 2 | 0x40000000 TO 0x400FFFFF | -1 | — | — |
| 59 | (3.0.0) | DEVICE 3 | 0x41000000 TO 0x41FFFFFF | 1 | (9.1.0) | 0xE8000000 TO 0xE8FFFFFF |
| 60 | (4.0.0) | DEVICE 4 | 0x48000000 TO 0x4FFFFFFF | 0 | (9.0.0) | 0xE0000000 TO 0xE7FFFFFF |

50

SWITCH APPARATUS

CROSS-REFERENCE TO RELATED APPLICATION

This application is based upon and claims the benefit of priority of the prior Japanese Patent Application No. 2010-202282 filed on Sep. 9, 2010, the entire contents of which are incorporated herein by reference.

FIELD

The embodiments discussed herein are related to a switch apparatus which dynamically connects an upstream device and a downstream device with each other.

BACKGROUND

Computers have I/O (Input/Output) buses used to expand functions. Examples of a standard I/O bus include a PCI (Peripheral Component Interconnect) bus and a PCIe (PCI Express) bus. To such a computer, a PCI device such as a NIC (Network Interface Card) can be coupled during operation of the computer. Attaching and detaching of the PCI device during operation of the computer is referred to as "hot-swap".

For example, when the hot-swap is performed on a computer using PCI devices which are compatible with PCI buses, the computer assigns identification numbers unique to the PCI devices coupled to the computer. Each of the identification numbers includes a bus number used to identify a bus configuration of a PCI bus and a device number used to identify a device coupled to a corresponding bus. The computer recognizes the connection relationship with the PCI devices using the identification numbers having bus numbers and device numbers.

The computer has a plurality of I/O slots. The computer is coupled to the PCI devices through the I/O slots. In the computer, a plurality of PCI devices may be coupled to a single I/O slot. The computer sets ranges of the identification numbers settable to the I/O slots in advance. In the identification numbers settable to the I/O slots, ranges of the bus numbers are limited. When the identification numbers set to the I/O slots include an unused bus number, the computer recognizes a PCI device which is newly coupled to one of the I/O slots.

As a technique of connecting a plurality of PCI devices to a single I/O slot, a switch apparatus has been proposed. The switch apparatus includes an upstream bridge and a plurality of downstream bridges. The upstream bridge is coupled to one of the I/O slots of the computer. The downstream bridges are coupled to individual PCI devices. Using the switch apparatus, a plurality of PCI devices are coupled to a single I/O slot by switching connections between the upstream bridge and the downstream bridges from one to another. The computer assigns identification numbers having different bus numbers to the PCI devices coupled to the downstream bridges. Japanese Laid-open Patent Publication No. 2007-226653 and Japanese Laid-open Patent Publication No. 2009-169842 disclose techniques of connecting a plurality of PCI devices to a computer.

When a switch apparatus to which a plurality of devices are coupled by hot-swap is coupled to a computer, the number of coupled devices may exceed a range of identification numbers assigned to I/O slots of the computer. The computer is not capable of recognizing devices having identification numbers which are out of the range of the assigned identification numbers.

SUMMARY

According to an aspect of the embodiment, a switch apparatus capable of being coupled to a computer and a plurality of devices, the switch apparatus includes: a first bridge coupled to the computer; a second-bridge group including a plurality of bridges coupled to the devices; and a controller for controlling the connection relationship between the first bridge and the second-bridge group, wherein the controller assigns physical identifiers having different bus identifiers to the plurality of devices, assigns logical identifiers to the devices in accordance with an identifier assigned to the first bridge in response to an instruction for reading connection states of the devices received from the computer when the computer is coupled to the first bridge, and converts a physical identifier and a logical identifier of a packet transmitted between the first bridge and the second-bridge group from one to another in accordance with the correspondence relationships between the physical identifiers and the logical identifiers which are assigned to the individual devices.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a conversion table;

DESCRIPTION OF EMBODIMENTS

Embodiments will be described hereinafter. Note that combinations of configurations of the embodiments are also included in embodiments of the present invention.

Figure 1:
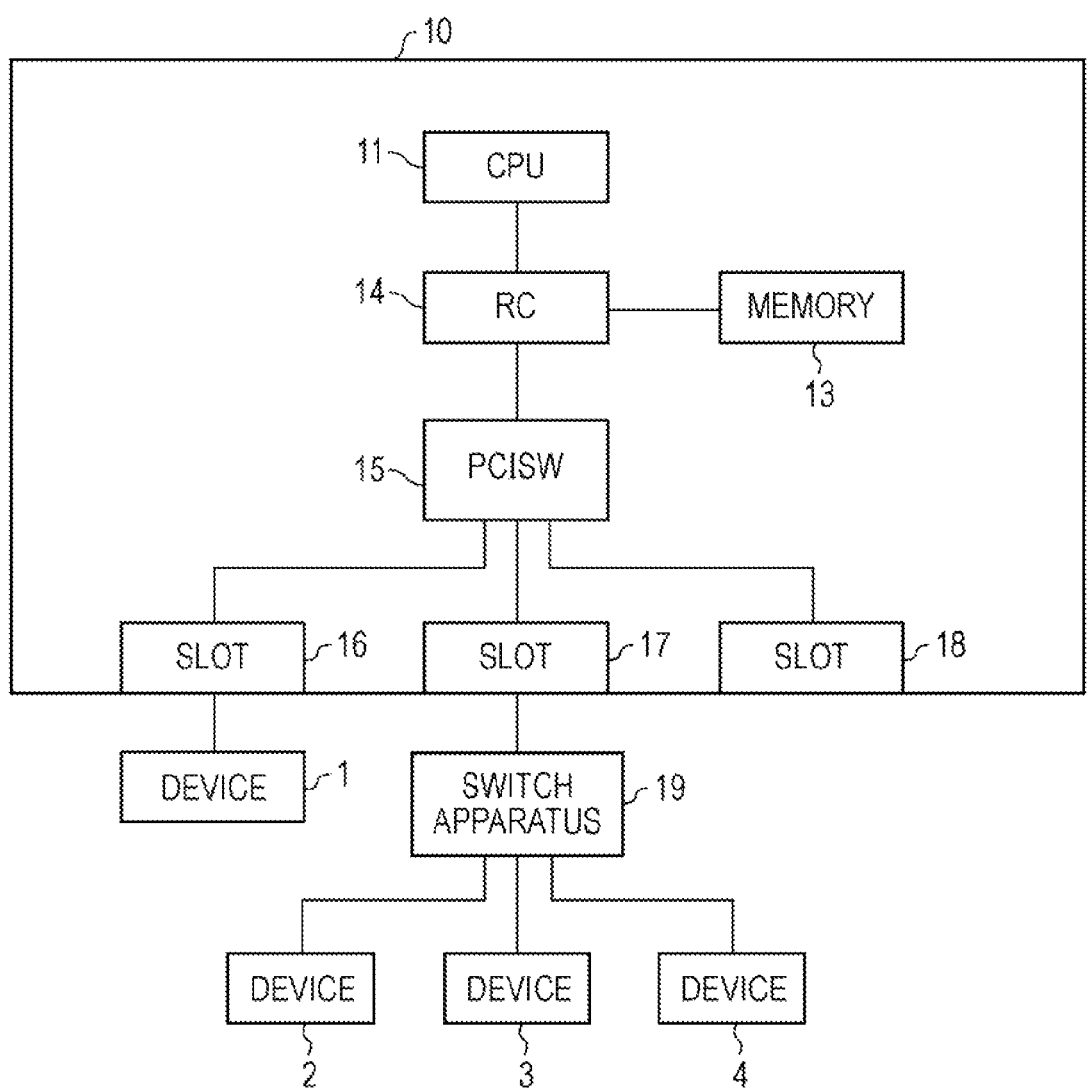
FIG. 1 is a block diagram illustrating a system including a switch apparatus.

FIG. 1 is a block diagram illustrating a system including a switch apparatus 19. The switch apparatus 19 is coupled to a computer 10. The computer 10 includes a CPU (Central Processing Unit) 11, a memory 13, an RC (Root Complex) 14, a PCISW (PCIe Switch) 15, and slots 16 to 18. A device 1 which is a PCIe device is coupled to the slot 16.

The switch apparatus 19 is coupled to the slot 17 of the computer 10 on an upstream side thereof. The switch apparatus 19 is coupled to devices 2 to 4 which are PCIe devices on a downstream side thereof. The devices 2 to 4 are coupled to the computer 10 through the switch apparatus 19. In this embodiment, a region located on the RC 14 side relative to the switch apparatus 19 is referred to as a data upstream. Furthermore, a region located on the devices 2 to 4 side relative to the switch apparatus 19 is referred to as a data downstream.

In the computer 10, the CPU 11 executes an OS (Operating System) so as to manage operation of the devices 1 to 4 which are coupled to the computer 10. The CPU 11 controls operation of the RC 14. The CPU 11 causes the memory 13 to store ranges of identification numbers to be assigned to the slots 16 to 18. Note that, although the identification numbers are numeric numbers in this embodiment, they may be identifiers including characters. Furthermore, bus numbers and device numbers may be bus identifiers and device identifiers including characters.

The memory 13 stores the identification numbers which may be assigned to the slots 16 to 18 in response to a request transmitted from the CPU 11. Furthermore, the memory 13 stores identification numbers of devices which have been coupled to the slots 16 to 18. The memory 13 stores ranges of addresses of devices corresponding to the identification numbers which may be assigned to the slots 16 to 18.

The RC 14 initializes an entire configuration of a PCI tree of devices coupled on the downstream side in response to a request issued by the OS which controls the computer 10. The RC 14 recognizes the configuration of the PCI tree of devices corresponding to PCIe buses by bus scan. The bus scan is a process executed by the RC 14 to analyze the PCI tree configuration. The RC 14 causes the memory 13 to store the configuration of the PCI tree of devices recognized by the bus scan. The RC 14 may be implemented on a chip set. An instruction for the bus scan may be issued by a device other than the RC 14.

The PCISW 15 switches an output destination of input data among the RC 14 and the slots 16 to 18 from one to another.

In this embodiment, the devices 1 to 4 are peripherals which comply with the PCIe. The device 1 is electrically coupled to the slot 16. The devices 2 to 4 are electrically coupled to the slot 17 through the switch apparatus 19.

The switch apparatus 19 switches the connection relationships between the computer 10 and the devices 2 to 4 which comply with the PCIe in accordance with an identification number. In this embodiment, the switch apparatus 19 is coupled to the devices 2 to 4 through different serial buses. In this embodiment, even when a number of devices corresponding to a number larger than the number of devices corresponding to the identification numbers assigned to the slot 17 are coupled on the downstream side, the switch apparatus 19 is capable of normally connecting the devices to the computer 10. A connection process performed by the switch apparatus 19 will be described hereinafter in detail.

Figure 2:
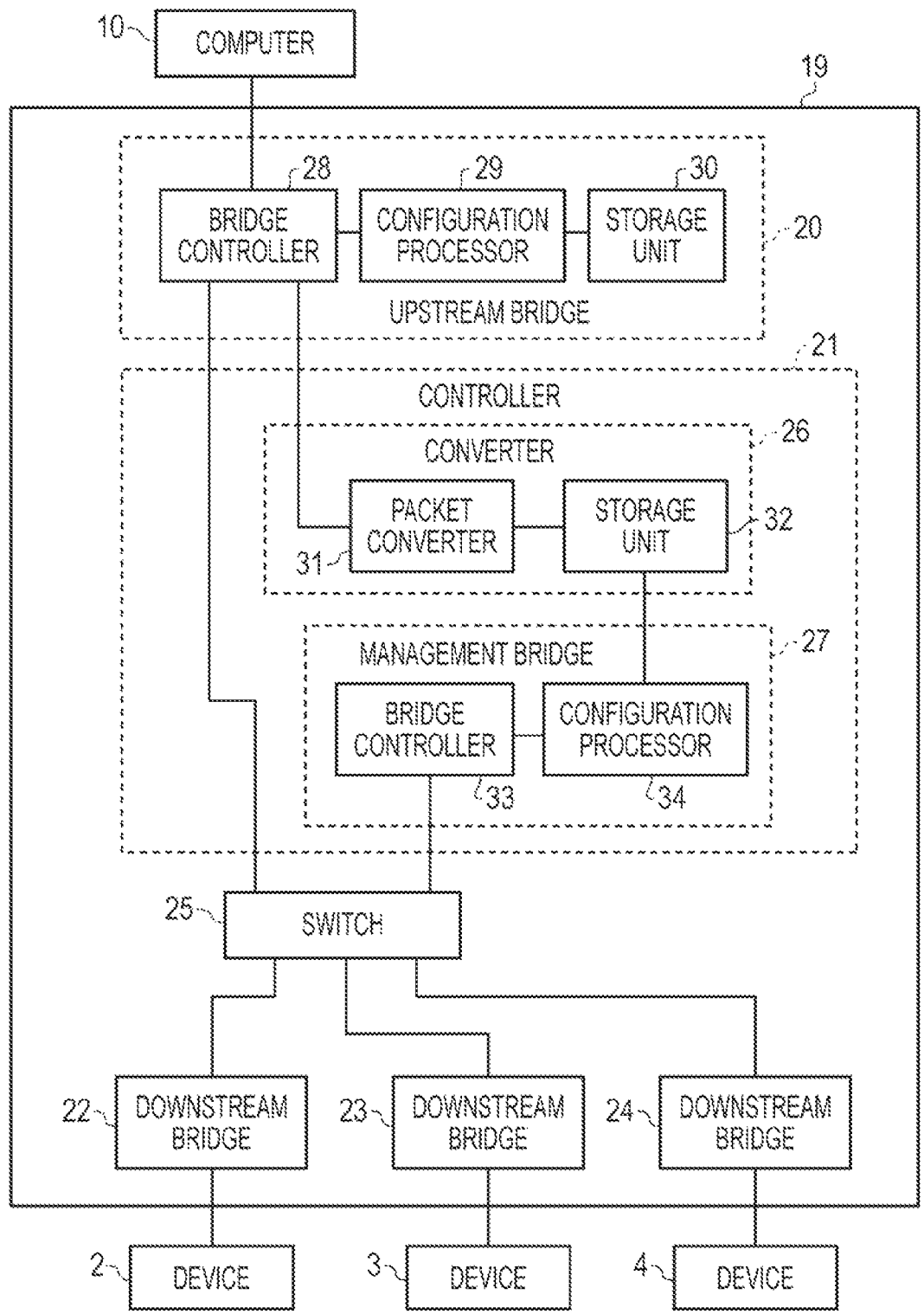
FIG. 2 is a block diagram illustrating the switch apparatus in detail.

FIG. 2 is a block diagram illustrating the switch apparatus 19 in detail. The switch apparatus 19 includes an upstream bridge 20, a controller 21, downstream bridges 22 to 24, and a switch 25.

The upstream bridge 20 performs packet transmission between an upstream bus and a downstream bus. In the PCIe, data is transmitted in a packet format. The upstream bridge 20 determines whether a packet is to be transmitted in accordance with information included in the packet. The upstream bridge 20 includes a bridge controller 28, a configuration processor 29, and a storage unit 30. A packet configuration in the packet transmission will be described below.

Figure 3:
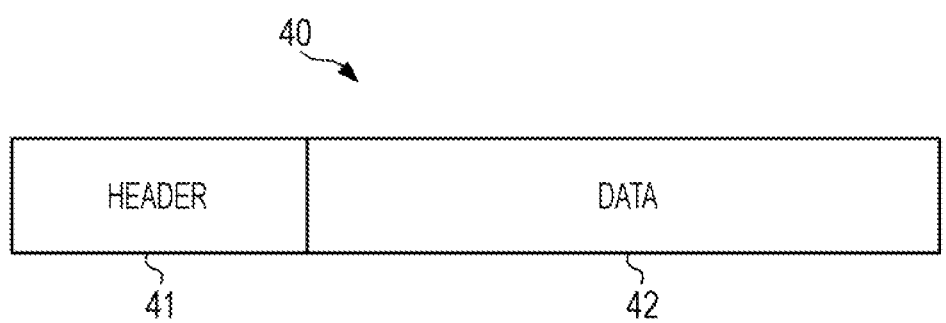
FIG. 3 is a diagram illustrating a format of a packet used in data transmission.

FIG. 3 is a diagram illustrating a format of a packet 40 used in data transmission. The packet 40 includes a header 41 and data 42. The header 41 includes routing information representing a method for transmitting the packet 40, identification information or address information representing a device serving as a transmission destination of the packet 40, and information on an instruction issued to the device serving as the transmission destination. The data 42 includes a result of a calculation process performed by a transmission source device to be transmitted to the transmission destination device. FIG. 2 is referred to again for description.

In FIG. 2, the bridge controller 28 controls packet transmission between the upstream bus and the downstream bus of the upstream bridge 20 in accordance with the information stored in the storage unit 30. The bridge controller 28 receives a packet including the routing information. The bridge controller 28 determines whether the packet is to be transmitted to another device or a destination of the packet is the apparatus itself in accordance with the routing information.

When determining that the received packet is to be transmitted in accordance with the routing information, the bridge controller 28 compares the identification information or the address information included in the packet with the configuration information stored in the storage unit 30. The bridge controller 28 determines whether the received packet is to be transmitted to a downstream device in accordance with a result of the comparison.

When determining that the destination of the received packet which is a configuration packet is the apparatus itself in accordance with the routing information, the bridge controller 28 transmits the received packet to the configuration processor 29.

The configuration processor 29 performs writing of information to the storage unit 30 or reading of information from the storage unit 30 in accordance with the configuration information included in the transmitted packet.

The storage unit 30 stores a configuration table. The configuration table includes control information for packet transmission control which is referred to or which is set as a configuration space by the OS or BIOS (Basic Input/Output System) of the computer 10. The BIOS is a program used to perform input/output with hardware coupled to the computer 10 in the lowest level. The configuration table further includes configuration information on the downstream bus of the upstream bridge 20. The storage unit 30 stores memory address information representing a range of a memory address and identification number range information representing a range of an identification number of a device coupled to the downstream bus.

Figure 4:
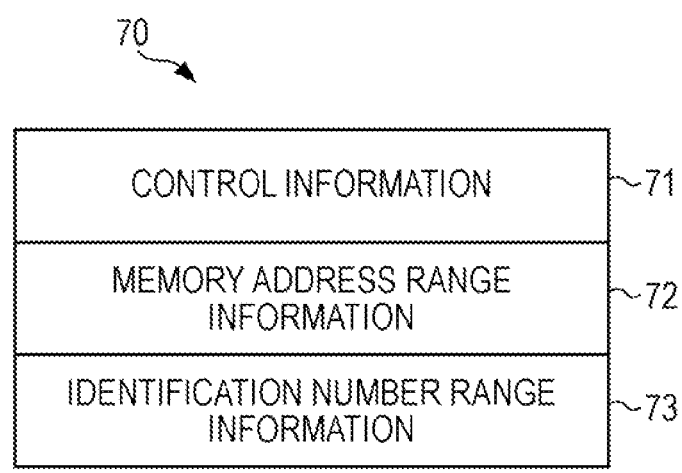
FIG. 4 is a diagram illustrating a configuration table stored in a storage unit.

FIG. 4 is a diagram illustrating a configuration table 70 stored in the storage unit 30. As described above, the configuration table 70 includes control information 71, memory address range information 72, and identification number range information 73.

The bridge controller 28 uses the configuration table 70 stored in the storage unit 30 for control of packet transmission. When receiving a packet having an instruction such as memory write as address routing, for example, the bridge controller 28 refers to the memory address range information 72 included in the storage unit 30. When a received destination address is within a memory address range corresponding to the memory address range information stored in the storage unit 30, the bridge controller 28 transmits the received packet to the downstream devices. Furthermore, when an instruction of the received packet represents routing in which identification number is specified, the bridge controller 28 refers to the identification number range information 73 included in the storage unit 30. When the identification number is within a range of identification numbers corresponding to the identification number range information 73 stored in the storage unit 30, the bridge controller 28 transmits the received packet to the downstream devices. Note that the bridge controller 28 transmits a packet received from the downstream bus to the upstream bus.

FIG. 2 is referred to again for description. The switch 25 switches the connection relationships between the buses from one to another for each packet. By switching the connection relationships between the buses from one to another using the switch 25, the packet 40 can be transmitted to an address represented by the header 41.

The downstream bridges 22 to 24 perform packet transmission between the upstream device and the downstream devices. In the PCIe, data is transmitted in a packet format. The downstream bridges 22 to 24 determine whether a packet is to be transmitted in accordance with identification information of a device included in the packet. Configurations and functions of the downstream bridges 22 to 24 are the same as that of the upstream bridge 20, and therefore, descriptions thereof are omitted.

The devices 2 to 4 coupled to the downstream bridges 22 to 24, respectively, conform to a PCI e standard. Each of the devices 2 to 4 has a unique physical identification number assigned by a management bridge 27 which will be described below. The physical identification number is assigned through the bus scan executed by the management bridge 27. The physical identification number is valid only in devices located downstream of the management bridge 27. Note that the devices 2 to 4 may include the downstream bridges 22 to 24, respectively. Furthermore, when other switch apparatuses are coupled instead of the devices 2 to 4, a larger number of devices can be coupled.

The devices 2 to 4 have information on memory sizes required for their own operation. The devices 2 to 4 notify the management bridge 27 of the memory size information in response to the bus scan performed by the management bridge 27. The management bridge 27 writes, to the storage unit, address range information of memories corresponding to the memory sizes required for the operation of the devices 2 to 4 in accordance with the memory size information transmitted from the devices 2 to 4.

The controller 21 controls the connection relationships between the upstream bridge 20 and the downstream bridges 22 to 24. The controller 21 converts logical identification numbers into physical identification numbers of the devices which are included in the received packet and vice versa in accordance with a conversion table generated in advance. The logical identification numbers are virtual identification numbers assigned so that the RC 14 recognizes the devices coupled downstream of the management bridge 27. The physical identification numbers are assigned to the devices by the management bridge 27.

The controller 21 includes a conversion unit 26 and the management bridge 27. The conversion unit 26 converts identification information and address range information included in configuration information of a packet received by the bridge controller 28 into another identification information and another address range information. The conversion unit 26 includes a packet converter 31 and a storage unit 32. The packet converter 31 converts identification information and destination address information included in a header 41 of a packet which is transmitted from the upstream bridge 20 to the switch 25 or which is received by the upstream bridge 20 from the switch 25 using a method described below in accordance with the conversion table stored in the storage unit 32. The storage unit 32 stores the conversion table to be referred to by the packet converter 31.

The management bridge 27 recognizes a configuration of links among the devices coupled to the downstream buses by bus scan. The management bridge 27 causes the storage unit 32 to store the configuration of the links among the devices which are recognized by the bus scan. The management bridge 27 includes a bridge controller 33 and a configuration processor 34. The bridge controller 33 executes the bus scan on the devices coupled to the downstream buses. The management bridge 27 assigns identification numbers to the bridges 22 to 24 and the devices 2 to 4 which are coupled to the downstream buses. The management bridge 27 causes the storage unit 32 to store the information on the links of the downstream buses obtained by the bus scan. The link information includes physical identification numbers of the devices 2 to 4 and the information on the required memories sizes for the operation of the devices 2 to 4.

The bridge controller 33 outputs a request signal to the upstream bridge 20 so as to obtain an identification number assigned to the upstream bridge 20. The bridge controller 33 writes the obtained identification number of the upstream bridge 20 to the storage unit 32.

When determining that the received packet includes the configuration information in accordance with the header 41 included in the packet received from the upstream bridge 20, the bridge controller 33 transmits the received packet to the configuration processor 34.

The configuration processor 34 performs writing to the storage unit 32 in accordance with content of the configuration information included in the transmitted packet. The configuration processor 34 generates a conversion table in accordance with the identification numbers of the upstream bridge 20 and the devices 2 to 4 and the address range information which are stored in the storage unit 32. A procedure of the generation of the conversion table will be described hereinafter in detail.

As described above, the switch apparatus 19 analyzes the configuration of the links among the downstream bus using the controller 21 and uses the generated conversion table so as to be coupled to a number of PCI devices corresponding to a number larger than the number of PCI devices corresponding to the identification numbers assigned to an I/O slot of the computer on the upstream side.

Figure 5:
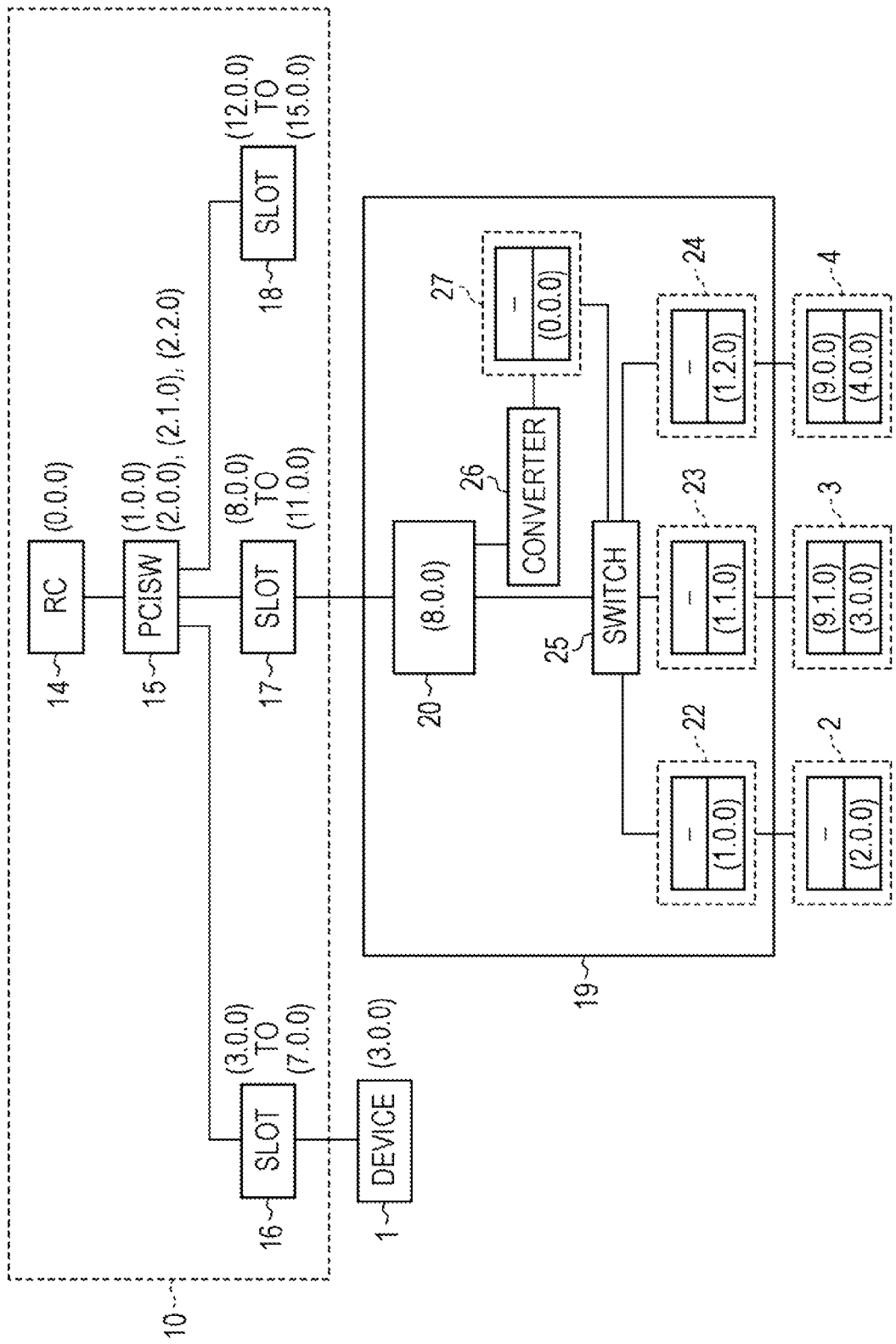
FIG. 5 is a block diagram illustrating the correspondence relationships between physical identification numbers and logical identification numbers.

FIG. 5 is a block diagram illustrating the correspondence relationships between logical identification numbers and physical identification numbers of the devices included in the system. In the block diagram shown in FIG. 5, components the same as those shown in FIGS. 1 and 2 are denoted by reference numerals the same as those shown in FIGS. 1 and 2, and therefore, descriptions thereof are omitted. Note that the correspondence relationships between the logical identification numbers and the physical identification numbers are not limited to those shown in FIG. 5.

In the computer 10 shown in FIG. 5, numbers located on the right sides of the devices denote identification numbers of the devices. Each of the identification numbers is defined using three numbers. A number located in a left portion in an identification number denotes a bus number. An execution source of the bus scan assigns identification numbers having different bus numbers to devices coupled to different bus lines. A number located in a center portion in the identification number denotes a device number. The execution source of the bus scan assigns different device numbers to devices coupled to a single bus line. A number located in a right portion in the identification number denotes a function number. The execution source of the bus scan assigns different function numbers to function blocks implemented in a single device. Note that the execution source of the bus scan corresponds to the RC 14 or the management bridge 27 in this embodiment.

The identification numbers shown in FIG. 5 are assigned to the devices in accordance with a result of the execution of the bus scan performed by the RC 14. Since the RC 14 serving as the execution source of the bus scan is located on the most upstream side of the network, an identification number of the RC 14 is (0. 0. 0). In this embodiment, the PCISW 15 has a single upstream bridge and three downstream bridges. The RC 14 assigns different identification numbers to the different bridges. In the PCISW 15, an identification number (1. 0. 0) is assigned to the upstream bridge connected on the RC 14 side. Identification numbers (2. 0. 0), (2. 1. 0), and (2. 2. 0) are assigned to the downstream bridges of the PCISW 15.

The RC 14 assigns identification numbers within a certain range to the slots 16 to 18 which are coupled to the corresponding downstream bridges of the PCISW 15 provided that a plurality of devices are coupled to each of the slots 16 to 18. In this embodiment, the RC 14 assigns identification numbers (3. 0. 0) to (7. 0. 0) to the slot 16, identification numbers (8. 0. 0) to (11. 0. 0) to the slot 17, and identification numbers (12. 0. 0) to (15. 0. 0) to the slot 18. The RC 14 assigns the identification numbers assigned to the slots to devices coupled to the slots in an ascending order. Therefore, the RC 14 assigns the identification number (3. 0. 0) to the device 1 coupled to the slot 16 to which the identification numbers (3. 0. 0) to (7. 0. 0) are assigned. Furthermore, the RC 14 assigns the identification number (8. 0. 0) to the upstream bridge 20 included in the switch apparatus 19 coupled to the slot 17 to which the identification numbers (8. 0. 0) to (11. 0. 0) are assigned.

Each of devices included in the switch apparatus 19 and the devices 2 to 4 connected downstream of the switch apparatus 19 has two identification numbers. Numbers shown in upper portions in blocks of the drawing denote logical identification numbers whereas numbers shown in lower portions in the blocks of the drawing denote physical identification numbers.

In a state in which the switch apparatus 19 is not coupled to the computer 10, the management bridge 27 executes the bus scan on the downstream devices. The physical identification numbers are assigned to the individual devices in accordance with a result of the execution of the bus scan. The management bridge 27 serving as an execution source of the bus scan has a physical identification number (0. 0. 0).

The downstream bridges 22 to 24 are coupled to the same switch 25. The management bridge 27 assigns different physical identification numbers (1. 0. 0), (1. 1. 0), and (1. 2. 0) which include the same bus number and different device numbers to the downstream bridges 22 to 24. The downstream bridges 22 to 24 are coupled to the devices 2 to 4, respectively, through different bus lines. The management bridge 27 assigns physical identification numbers (2. 0. 0), (3. 0. 0), and (4. 0. 0) including different bus numbers to the devices 2 to 4 which are coupled to the downstream bridges 22 to 24, respectively.

The management bridge 27 writes the physical identification numbers assigned to the devices in accordance with the bus scan to the storage unit 32 included in the conversion unit 26. Furthermore, the management bridge 27 obtains physical memory address ranges required for operation of the devices 2 to 4 in accordance with the bus scan. The management bridge 27 writes the obtained physical memory address ranges to the storage unit 32. Information written by the management bridge 27 to the storage unit 32 will be described in detail hereinafter with reference to FIG. 6.

FIG. 6 shows a conversion table 50 generated in accordance with the information obtained through the execution of the bus scan performed by the management bridge 27. A column 51 includes physical identification numbers of the downstream devices obtained through the bus scan performed by the management bridge 27. A column 52 includes types of the devices corresponding to the physical identification numbers. A column 53 includes physical memory address ranges required for the operation of the devices.

A column 54 shown in FIG. 6 includes device numbers obtained by conversion performed by the conversion unit 26 when the RC 14 included in the computer 10 performs bus scan. A device to which a device number "−1" is assigned is ignored when the RC 14 performs the bus scan. Therefore, the downstream bridges 22 to 24 are ignored in this embodiment. Furthermore, since the computer 10 does not use the device 2 in this embodiment, the device number "−1" is assigned to the device 2. Since the device number "−1" is assigned to the unused device, the device 2 is ignored when the RC 14 performs the bus scan. By performing a setting such that the downstream bridges and the device which is not used by the upstream device are ignored when the bus scan is performed, resources of identification numbers to be assigned to the switch apparatus 19 when the RC 14 performs the bus scan can be saved to the requisite minimum. The device numbers may be edited by the user. Furthermore, when a type included in the column 52 represents a downstream bridge, the management bridge 27 performs a process such that a device number in the column 54 is automatically set to "−1".

Furthermore, the device numbers included in the column 54 represent an order of recognition of the devices when the RC 14 performs the bus scan. The conversion unit 26 recognizes the devices when the RC 14 performs the bus scan in order from a device number "0". As shown in the column 53, the operation of the different devices requires different memory sizes. Therefore, by changing the order of the devices to be recognized when the RC 14 performs the bus scan, sizes of address spaces to be ensured in the computer 10 can be optimized. Here, the address spaces of the computer 10 represent ranges of addresses assigned for device control in a memory space which is controllable by the CPU 11 of the computer 10. The optimization of the sizes of the address spaces by changing the order of the devices to be recognized will be described hereinafter.

A column 61 includes logical identification numbers of devices which operate in response to the bus scan performed by the computer 10 serving as the upstream device. The management bridge 27 monitors the bus scan performed by the computer 10. The logical identification numbers of the devices are determined in accordance with the logical identification number assigned to the upstream bridge 20 through the bus scan performed by the computer 10 and the device numbers included in the column 54 when the switch apparatus 19 is coupled to the computer 10. In this embodiment, after the computer 10 is coupled to the upstream bridge 20, the identification number (8. 0. 0) is assigned to the upstream bridge 20 in response to a bus scan instruction received from the computer 10. The management bridge 27 assigns logical identification numbers (9. 1. 0) and (9. 0. 0) which include the same bus number to the devices 3 and 4 as shown in the column 61 in accordance with the identification number (8. 0. 0) assigned to the upstream bridge 20 and the device numbers included in the column 54. The management bridge 27 writes the logical identification numbers assigned to the devices to the conversion table 50. Since the same bus number is included, the switch apparatus 19 can efficiently use resources corresponding to the bus number assigned to the slot 17.

A column 62 includes logical memory address ranges of the devices which operate in response to the bus scan performed by the computer 10. The logical memory address ranges of the devices are determined in accordance with the logical identification numbers assigned to the devices through the bus scan performed by the computer 10 when the switch apparatus 19 is coupled to the computer 10. As described above, in the address spaces of the computer 10, the memory address ranges having fixed lengths which correspond to the identification numbers are included. For example, when the logical identification number (9. 1. 0) is assigned to the device 3, a starting address of an address space of the computer 10 corresponding to the logical identification number is determined. The management bridge 27 obtains the determined starting address of the address space of the computer 10 as configuration information when the computer 10 performs the bus scan. The management bridge 27 determines logical memory address ranges corresponding to the physical memory address ranges included in the column 53 using obtained starting addresses as references. For example, when starting addresses of address spaces of the computer 10 corresponding to the logical identification numbers (9. 1. 0) and (9. 0. 0) are "0xE8000000" and "0xE0000000", logical memory address ranges of the devices 3 and 4 are "0xE8000000 to 0xE8FFFFFF" and "0xE0000000 to 0xE7FFFFFF", respectively, as shown in the column 62. The management bridge 27 writes the assigned logical memory address ranges to the conversion table 50.

Rows 55 to 60 represent information unique to the devices. For example, referring to the row 55, according to the column 52, a device to which the physical identification number (1. 0. 0) is assigned is the downstream bridge 22. According to the column 53, a physical memory address range required for the operation of the downstream bridge 22 is not set. According to the column 54, the downstream bridge 22 is ignored when the RC 14 performs the bus scan.

Furthermore, referring to the row 60, according to the column 52, a device to which the physical identification number (4. 0. 0) is assigned is the device 4. According to the column 53, a physical memory address range required for the operation of the device 4 is "0x48000000 to 0x4FFFFFFF". According to the column 54, when the RC 14 performs the bus scan, a device number is first assigned to the device 4. According to the column 61, the RC 14 identifies the device 4 by the logical identification number (9. 0. 0). According to the column 62, the RC 14 assigns the logical memory address range "0xE0000000 to 0xE7FFFFFF" to the memory 13 as the memory address range required for the operation of the device 4.

FIG. 5 is referred to again for description. When the switch apparatus 19 is coupled to the computer 10, the RC 14 executes the bus scan on all the devices including the switch apparatus 19. To the slot 17, only the switch apparatus 19 is connected. As described above, the RC 14 assigns the identification numbers (8. 0. 0) to (11. 0. 0) to the slot 17. Therefore, the RC 14 assigns the identification number (8. 0. 0) to the upstream bridge 20 included in the switch apparatus 19 coupled to the slot 17. In FIG. 5, the identification number (8. 0. 0) corresponding to the upstream bridge 20 serves as the logical identification number of the upstream bridge 20.

The management bridge 27 obtains the identification number (8. 0. 0) assigned to the upstream bridge 20. The management bridge 27 assigns the identification numbers (9. 1. 0) and (9. 0. 0) to the devices 3 and 4, respectively, in accordance with the obtained logical identification number of the upstream bridge 20. The management bridge 27 writes the logical identification numbers of the devices 3 and 4 to the conversion table 50 included in the conversion unit 26. In FIG. 5, identification numbers included in upper portions in blocks corresponding to the devices 3 and 4 represent the logical identification numbers of the devices 3 and 4, respectively. As shown in FIG. 5, a logical identification number is not assigned to the management bridge 27, the downstream bridges 22 to 24, and the device 2. That is, the RC 14 recognizes only the devices 3 and 4 to which the logical identification numbers (9. 1. 0) and (9. 0. 0) are assigned, respectively, on a downstream side relative to the upstream bridge 20 using the conversion unit 26.

Communication between the computer 10 and the device 3 through the switch apparatus 19 will be described below. The computer 10 specifies the logical identification number (9. 1. 0) and transmits a packet when transmitting an instruction to the device 3. The upstream bridge 20 transmits the received packet to the conversion unit 26. The conversion unit 26 which received the packet obtains the logical identification number (9. 1. 0) from a header of the packet. The conversion unit 26 refers to the physical identification number (3. 0. 0) using the obtained logical identification number (9. 1. 0) in accordance with the conversion table 50. The conversion unit 26 replaces the logical identification number of the packet by the physical identification number which has been referred to. The conversion unit 26 transmits the updated packet to the upstream bridge 20. The updated packet is transmitted from the upstream bridge 20 to the device 3 in accordance with the physical identification number.

When transmitting an instruction such as memory read to the device 3 by address routing, the computer 10 transmits a packet after specifying the logical memory address range "0xE8000000 to 0xE8FFFFFF". The address routing is to route a transmission destination of a packet in accordance with a memory address assigned to a device. The upstream bridge 20 transmits the received packet to the conversion unit 26. The conversion unit 26 which received the packet obtains the logical memory address range "0xE8000000 to 0xE8FFFFFF" from a header of the packet. The conversion unit 26 refers to a physical memory address range "0x41000000 to 0x41FFFFFF" using the obtained logical memory address range "0xE8000000 to 0xE8FFFFFF" in accordance with the conversion table 50. The conversion unit 26 replaces the logical memory address range of the packet by the physical memory address range which has been referred to. The conversion unit 26 transmits the updated packet to the upstream bridge 20. The upstream bridge 20 transmits the updated packet to the device 3 in accordance with the physical memory address range.

Next, a case where the device 3 responds to an instruction transmitted from the computer 10 will be described. The device 3 transmits a packet including a header having the physical identification number (3. 0. 0) of itself written therein to the computer 10. The conversion unit 26 which received the packet obtains the physical identification number (3. 0. 0) from the header of the packet. The conversion unit 26 refers to the logical identification number (9. 1. 0) using the obtained physical identification number (3. 0. 0) in accordance with the conversion table 50. The conversion unit 26 replaces the physical identification number of the packet by the logical identification number which has been referred to. The updated packet is transmitted to the RC 14 of the computer 10. The RC 14 can recognize that the packet was transmitted from the device 3 with reference to the logical identification number (9. 1. 0) of the packet.

As described above, the conversion unit 26 of the switch apparatus 19 causes the computer 10 to identify the downstream devices in accordance with requisite minimum identification numbers. Furthermore, the conversion unit 26 of the switch apparatus 19 can reliably relay packet communication between the computer 10 and the downstream devices.

Figure 7:
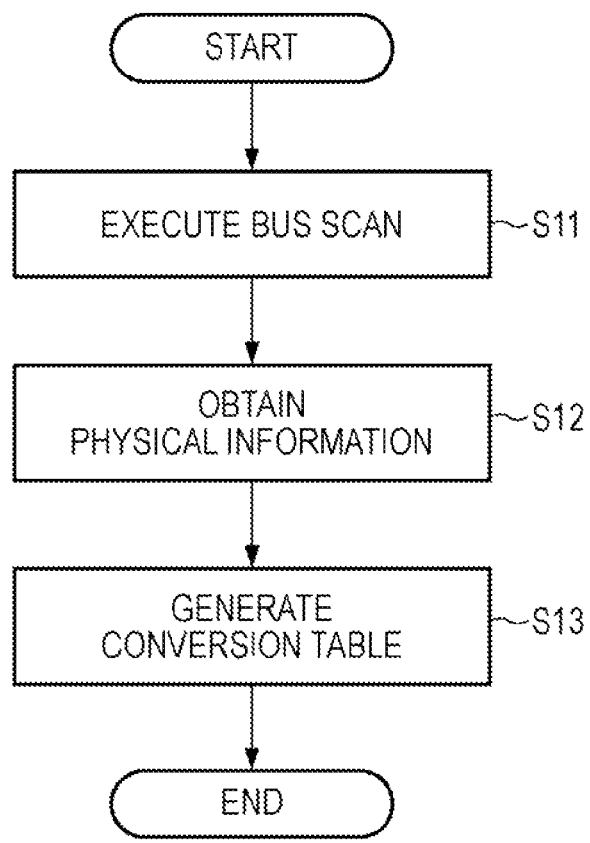
FIG. 7 is a flowchart illustrating a configuration information obtaining operation performed by the switch apparatus before a computer is coupled.

FIG. 7 is a flowchart illustrating a physical information obtaining operation performed by the switch apparatus 19 before the switch apparatus 19 is coupled to the computer 10. The flow of the operation shown in FIG. 7 is performed in a state in which the switch apparatus 19 is turned on and the switch apparatus 19 is logically not coupled to the computer 10. The logical connection between the computer 10 and the switch apparatus 19 means that the computer 10 detects the switch apparatus 19. When the switch apparatus 19 is turned on, the management bridge 27 executes the bus scan on the downstream devices (in step S11). The management bridge 27 obtains the physical identification numbers and the physical memory address ranges which are physical information of the downstream bridges 22 to 24 and the devices 2 to 4 which are the downstream devices (in step S12). The management bridge 27 generates the conversion table 50 in accordance with the obtained physical information (in step S13). The management bridge 27 adds device numbers representing devices which are not required to be detected by the computer 10 and device numbers representing an order of detection performed by the computer 10. The management bridge 27 writes the generated conversion table 50 to the storage unit 32.

As described above, since the switch apparatus 19 includes the management bridge 27 having a bus scan function, the switch apparatus 19 can obtain the physical information of the downstream bridges 22 to 24 and the devices 2 to 4 in a state in which the switch apparatus 19 is not coupled to the computer 10.

Figure 8:
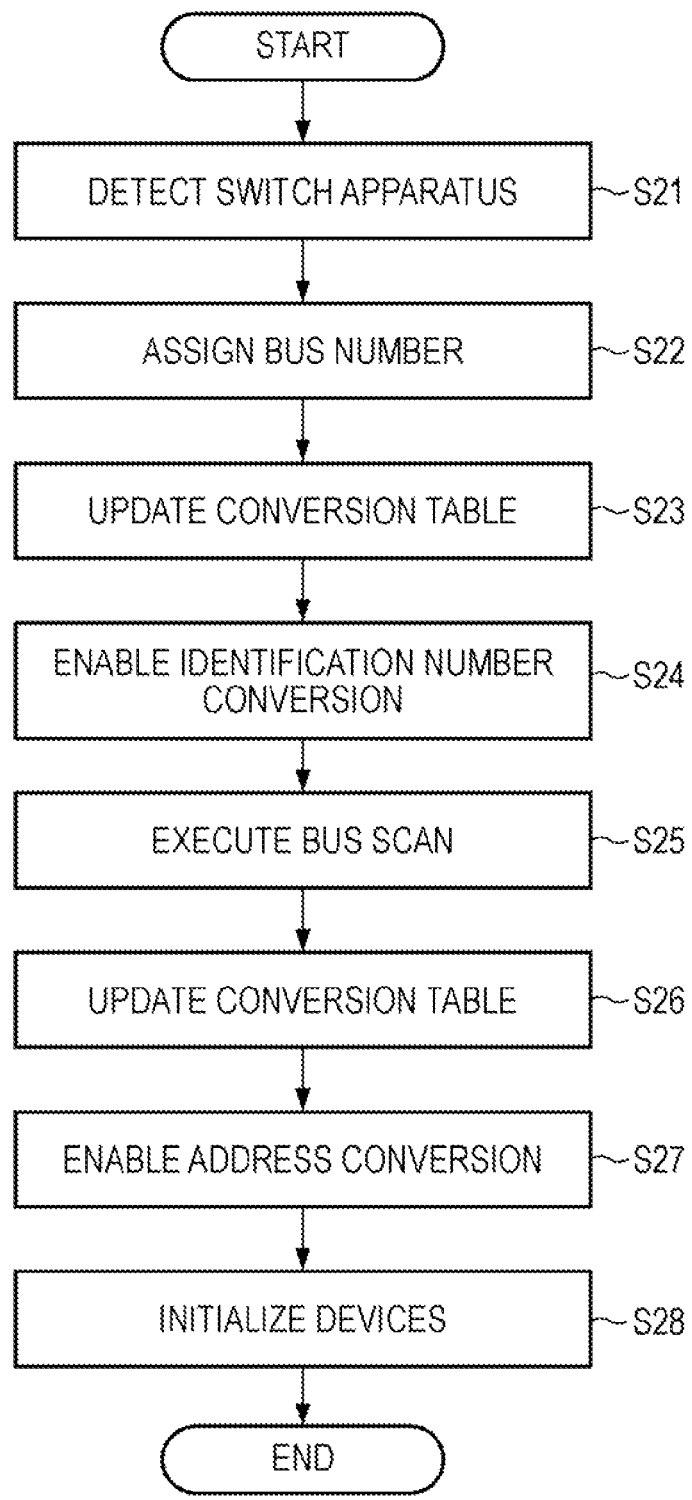
FIG. 8 is a flowchart illustrating an initial setting operation performed by the switch apparatus when the computer is coupled.

FIG. 8 is a flowchart illustrating operation of the computer 10 and the switch apparatus 19 when the switch apparatus 19 is coupled to the computer 10. When the switch apparatus 19 is logically coupled to the computer 10, the RC 14 of the computer 10 detects the switch apparatus 19 (in step S21). The RC 14 performs the bus scan and assigns the identification number (8. 0. 0) to the detected upstream bridge 20 of the switch apparatus 19 (in step S22).

When detecting the identification number (8. 0. 0) assigned to the upstream bridge 20, the management bridge 27 of the switch apparatus 19 updates the conversion table 50 in accordance with the detected logical identification number of the upstream bridge 20 (in step S23). In this embodiment, the management bridge 27 assigns the logical identification numbers (9. 1. 0) and (9. 0. 0) to the devices 3 and 4 in accordance with the detected identification number (8. 0. 0) and the device numbers. The management bridge 27 writes the assigned logical identification numbers to the conversion table 50.

After the logical identification numbers are written to the conversion table 50, the management bridge 27 enables an identification number conversion process performed by the conversion unit 26 (in step S24). The conversion unit 26 converts an identification number of a received packet in accordance with the conversion table 50 stored in the storage unit 32 and transmits the packet obtained after the conversion.

The RC 14 continues the bus scan performed on the all the devices including the switch apparatus 19 in accordance with an instruction issued by the CPU 11 which executes the OS (in step S25). The conversion unit 26 converts received logical identification numbers obtained through the bus scan into the physical identification numbers of the devices. The physical identification numbers which are obtained after the conversion and which are transmitted from the conversion unit 26 serve as accesses to the buses which connect the switch apparatus 19 to the devices 3 and 4.

The management bridge 27 obtains starting addresses of the devices corresponding to the logical identification numbers assigned during the bus scan. The management bridge 27 sets the logical memory address ranges of the devices 3 and 4 in accordance with the obtained starting addresses and the physical memory address ranges. The management bridge 27 writes the set logical identification numbers and the set logical memory address ranges to the conversion table 50 (in step S26).

After the conversion table 50 is updated, the management bridge 27 enables an address conversion process which is performed by the conversion unit 26 to convert the memory address ranges (in step S27). The conversion unit 26 converts the identification information and the memory address range of the received packet in accordance with the conversion table 50 stored in the storage unit 32 and transmits the packet after the conversion.

The RC 14 loads device drivers corresponding to the devices on the memory 13 in accordance with an instruction issued by the CPU 11 which executes the OS and initializes the devices (in step S28). Each of the device drivers is software which mediates between a common interface provided by the OS and hardware of a corresponding device.

As described above, since the conversion unit 26 of the switch apparatus 19 performs the conversion of the packet, a number of devices corresponding to the number larger than the number of devices corresponding to the identification numbers assigned to the slot 17 of the computer 10 can be normally connected.

Figure 9:
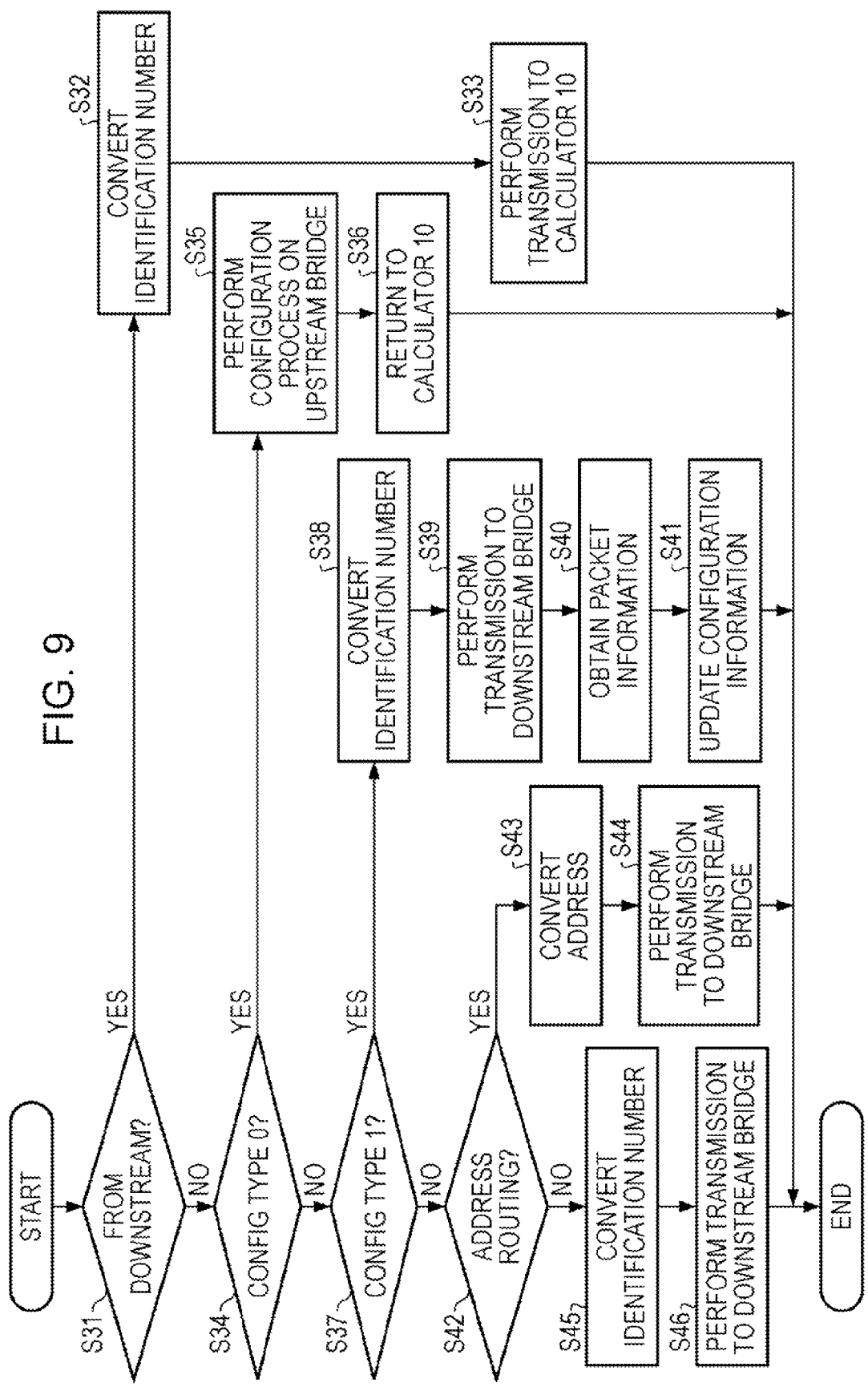
FIG. 9 is a flowchart illustrating a conversion operation performed by the switch apparatus after the computer is coupled.

FIG. 9 is a flowchart illustrating a packet process performed after the switch apparatus 19 is coupled to the computer 10. When receiving a packet, the upstream bridge 20 determines whether the packet has been transmitted from the computer 10 serving as the upstream device or the packet has been transmitted from one of the downstream devices (in step S31). When the packet has been transmitted from one of the downstream devices (when the determination is affirmative in step S31), the bridge controller 28 included in the upstream bridge 20 transmits a physical identification number extracted from a header of the packet to the conversion unit 26. The conversion unit 26 converts the physical identification number of the packet received from the upstream bridge 20 into a logical identification number (in step S32). The conversion unit 26 transmits the logical identification number to the upstream bridge 20. The upstream bridge 20 transmits the packet including the header in which the physical identification number is replaced by the logical identification number to the computer 10 serving as the upstream device (in step S33).

When the received packet has not been transmitted from one of the downstream devices but has been transmitted from the computer 10 located on the upstream side (when the determination is negative in step S31), the upstream bridge 20 checks a value of "Configuration Type" included in the header (in step S34). The value "Configuration Type" is used for a determination as to whether a destination of the transmission of the packet is the bridge which received the packet, the determination being performed by the bridge. When the value of "Configuration Type" of the packet received by the upstream bridge 20 is "0" (when the determination is affirmative in step S34), the bridge controller 28 included in the upstream bridge 20 determines that the destination of the transmission of the packet is the upstream bridge 20 and transmits the received packet to the configuration processor 29. The configuration processor 29 executes a command described in the received packet (in step S35). The configuration processor 29 transmits a result of the process to the bridge controller 28. The bridge controller 28 returns the result of the process to the computer 10 serving as a transmission source of the packet (in step S36).

When a value of the "Configuration Type" received by the upstream bridge 20 is not "0" (when the determination is negative in step S34), the upstream bridge 20 determines whether the value of "Configuration Type" of the received packet is "1" (in step S37). When the value of "Configuration Type" of the received packet is "1" (when the determination is affirmative in step S37), the bridge controller 28 of the upstream bridge 20 transmits a logical identification number extracted from the header of the packet to the converter 26. The conversion unit 26 converts the logical identification number of the received packet to a physical identification number in accordance with the stored conversion table 50 (in step S38). The conversion unit 26 transmits the physical identification number to the upstream bridge 20. The upstream bridge 20 transmits the packet including the header having the converted physical identification number to the downstream bridges 22 to 24 (in step S39).

Furthermore, the conversion unit 26 obtains packet information by writing the information on the header of the packet received by the packet converter 31 to the storage unit 32 (in step S40). The management bridge 27 compares the packet information written to the storage unit 32 with information included in the conversion table 50. When a logical identification number or a logical memory address range of the written packet information are different from a logical identification number or a logical memory address range included in the conversion table 50, the management bridge 27 updates configuration information of the conversion table 50 in accordance with the written packet information (in step S41).

When the value of "Configuration Type" received by the upstream bridge 20 is neither "0" nor "1" (when the determination is negative in step S37), the upstream bridge 20 determines whether the received packet corresponds to address routing (in step S42). When the received packet corresponds to the address routing (when the determination is affirmative in step S42), the upstream bridge 20 transmits the header information of the received packet to the packet converter 31 included in the conversion unit 26. The packet converter 31 converts the logical memory address range included in the received header information into a physical memory address range in accordance with the conversion table 50 (in step S43). The packet converter 31 transmits the converted physical memory address range to the bridge controller 28. The bridge controller 28 updates the header information of the packet in accordance with the received physical memory address range. The bridge controller 28 transmits the packet in which the header information is updated to the downstream bridges 22 to 24 (in step S44).

When the received packet does not correspond to the address routing (when the determination is negative in step S42), the upstream bridge 20 transmits the header information of the received packet to the packet converter 31 included in the conversion unit 26. The packet converter 31 converts the logical identification number included in the received header information into a physical identification number in accordance with the conversion table 50 (in step S45). The packet converter 31 transmits the converted physical identification number to the bridge controller 28. The bridge controller 28 updates the header information of the packet in accordance with the physical identification number. The bridge controller 28 transmits the packet including the updated header information to the downstream bridges 22 to 24 (in step S46).

Note that, although the upstream bridge 20 transmits only the header information to the conversion unit 26 in this embodiment, the upstream bridge 20 may transmit the received packet to the conversion unit 26. In this case, the conversion unit 26 transmits the packet including the updated header to the upstream bridge 20.

As described above, the switch apparatus 19 can converts the identification number and the memory address range in accordance with the conversion table 50 so that the computer 10 connected on the upstream side can normally perform packet communication with the devices 2 to 4 connected on the downstream side.

Figure 10A:
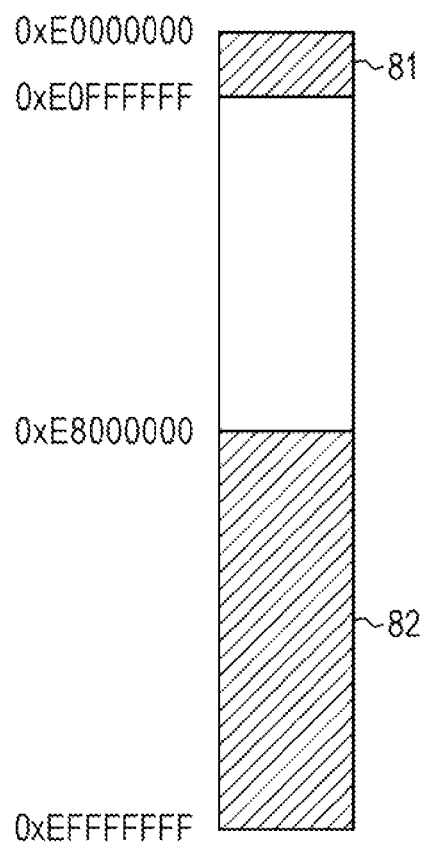
FIGS. 10A and 10B are diagrams illustrating an effect of reduction of an address range when an order of recognition of devices is changed.
Figure 10B:
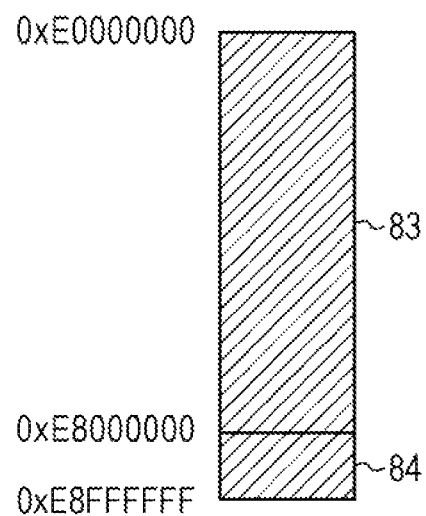

FIGS. 10A and 10B are diagrams illustrating an effect of reduction of the address space of the computer 10 when the order of recognition of the devices is changed. FIG. 10A shows logical memory address ranges in the computer 10 when the computer 10 performs the bus scan such that the device 3 is recognized before the device 4 is recognized. In FIG. 10A, a memory region 81 is secured in the computer 10 for control of the device 3 and a memory region 82 is secured in the computer 10 for control of the device 4. FIG. 10B shows the logical memory address ranges of the computer 10 when the computer 10 performs the bus scan such that the device 4 is recognized before the device 3 is recognized. In FIG. 10B, a memory region 83 is secured in the computer 10 for the control of the device 4 and a memory region 84 is secured in the computer 10 for the control of the device 3.

As described above, the RC 14 obtains a number of memory regions corresponding to identification numbers in the memory space of the computer 10. Memory sizes of the memory regions are fixed and starting addresses of the memory regions should be aligned, and therefore, the starting addresses of the memory regions corresponding to the identification numbers are automatically determined when the identification numbers are determined.

As shown in FIGS. 10A and 10B, in this embodiment, the starting addresses of the memory regions assigned to the devices 3 and 4 are "0xE0000000" or "0xE8000000". Furthermore, a memory size required for the control of the device 3 is 16 MB whereas a memory size required for the control of the device 4 is 128 MB.

As shown in FIG. 10A, in the case where the RC 14 recognizes the device 3 before recognizing the device 4, the memory region 81 having a memory size of 16 MB is secured from the address "0xE0000000" and the memory region 82 having a memory size of 128 MB is secured from the address "0xE8000000". As a result, a region corresponding to addresses "0xE0FFFFFF to 0xE7FFFFFF" is an unnecessary region which is secured although being not used by the device 3.

Unlike FIG. 10A, in FIG. 10B, the RC 14 recognizes the device 4 before recognizing the device 3. The RC 14 secures the memory region 83 having a memory size of 128 MB from the address "0xE0000000" as a memory region for the device 4. Furthermore, the RC 14 secures the memory region 84 having a memory size of 16 MB from the address "0xE8000000". Since the memory region for the device 4 has the size the same as that secured in accordance with the identification number, an unnecessary region as shown in FIG. 10A is not generated.

As described above, the switch apparatus 19 can optimize the address space ensured in the computer 10 by changing the order of the recognition performed by the computer 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch apparatus capable of being coupled to a computer and a plurality of devices, the switch apparatus comprising:
    a first bridge coupled to the computer;
    a second-bridge group including a plurality of bridges coupled to the devices;
    a controller that controls the connection relationship between the first bridge and the second-bridge group, assigns first identifiers identified by the devices having unique bus identifiers to the plurality of devices, assigns second identifiers identified by the computer to the devices in accordance with a third identifier assigned to the first bridge in response to an instruction for reading connection states of the devices received from the computer when the computer is coupled to the first bridge, acquires first memory address ranges corresponding to memory sizes required for the operation of the devices, and assigns second memory address ranges to a memory of the computer;
    a conversion table representing correspondence relationships between the first identifiers and the second identifiers, and representing correspondence relationships between the first memory address ranges and the second memory address ranges,
    wherein the controller converts one of the third identifiers and one of the second identifiers included in a packet transmitted between the first bridge and the second-bridge group from one to another based on the conversion table, and converts one of the first memory address ranges and one of the second memory ranges included in the packet based on the conversion table.

2. The switch apparatus according to claim 1, wherein each of the first identifiers and the second identifiers includes a bus identifier for identifying a bus and a device identifier for identifying a device, and the second identifiers include the same bus identifier and unique device identifiers.

3. The switch apparatus according to claim 1, wherein the controller
    obtains the third identifier when the switch apparatus is coupled to the computer, and
    determines the second identifiers in accordance with the third identifier and device identifiers set in advance.

4. The switch apparatus according to claim 1, wherein the conversion table includes information used for a determination as to whether each of the devices should be recognized by the computer.

5. The switch apparatus according to claim 1, wherein the conversion table includes information used for a determination of an order of the devices recognized by the computer.

6. A method of controlling a switch apparatus including a first bridge coupled to a computer and a second-bridge group including a plurality of bridges coupled to a plurality of devices, the method comprising:
    assigning first identifiers identified by the devices having different bus identifiers to the plurality of devices;
    assigning second identifiers identified by the computer to the devices in accordance with a third identifier assigned to the first bridge in response to an instruction for reading connection states of the devices received from the computer when the computer is coupled to the first bridge;
    acquiring first memory address ranges corresponding to memory sizes required for the operation of the devices;
    assigning second memory address ranges to a memory of the computer;
    converting one of the first identifiers and one of the second identifiers included in a packet transmitted between the first bridge and the second-bridge group from one to another in accordance with correspondence relationships between the first identifiers and the second identifiers which are assigned to the individual devices; and
    converting one of the first memory address ranges and one of the second memory address ranges included in the packet in accordance with correspondence relationships between the first memory address ranges and the second memory address ranges.

* * * * *